US011317286B2

(12) United States Patent
Rios, III et al.

(10) Patent No.: US 11,317,286 B2
(45) Date of Patent: Apr. 26, 2022

(54) NETWORK AUTHENTICATION VIA ENCRYPTED NETWORK ACCESS PACKAGES

(71) Applicant: AT&T Intellectual Property I, L.P., Atlanta, GA (US)

(72) Inventors: Roque Rios, III, Middletown, NJ (US); Luis Ramos, Columbia, CT (US); James Gordon Beattie, Jr., Bergenfield, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 772 days.

(21) Appl. No.: 15/927,747

(22) Filed: Mar. 21, 2018

(65) Prior Publication Data
US 2019/0297500 A1    Sep. 26, 2019

(51) Int. Cl.
*G06F 17/00* (2019.01)
*H04L 29/06* (2006.01)
(Continued)

(52) U.S. Cl.
CPC ............ *H04W 12/08* (2013.01); *H04L 9/32* (2013.01); *H04L 63/0428* (2013.01);
(Continued)

(58) Field of Classification Search
CPC ........... H04W 12/06; H04W 12/0602; H04W 12/0605; H04W 12/0608; H04W 12/0609;
(Continued)

(56) References Cited

U.S. PATENT DOCUMENTS 5,189,700 A    2/1993 Blandford
5,757,920 A    5/1998 Misra et al.
(Continued)

FOREIGN PATENT DOCUMENTS

WO    WO 2016/003310    1/2016

OTHER PUBLICATIONS

Grzonkowski, et al., "Sharing Cloud Services: User Authentication for Social Enhancement of Home Networking," IEEE Transactions on Consumer Electronics, Aug. 2011, vol. 57, No. 3, pp. 1424-1432.
(Continued)

*Primary Examiner* — Trong H Nguyen
(74) *Attorney, Agent, or Firm* — Hartman & Citrin LLC

(57) ABSTRACT

According to one aspect disclosed herein, a provider device can receive, from a requester device, a network access request requesting, on behalf of the requester device, access to a Wi-Fi network associated with a network provider and provided, at least in part, by a network device. In response, the provider device can prompt the network provider to accept or deny the requester device access to the Wi-Fi network. The provider device can receive input indicating that the network provider accepts the network access request, and in response to the input, can create a network access package that includes a secure network access configuration to be utilized by the network device to establish, at least in part, a secure connection with the requester device to provide the requester device access to the Wi-Fi. The provider device can encrypt the network access package to create an encrypted network access package.

20 Claims, 14 Drawing Sheets

(51) Int. Cl.
    *H04W 12/08*     (2021.01)
    *H04W 76/10*     (2018.01)
    *H04W 12/06*     (2021.01)
    *H04L 9/32*     (2006.01)
    *H04W 84/18*     (2009.01)
    *H04W 84/12*     (2009.01)

(52) U.S. Cl.
    CPC ............. *H04L 63/20* (2013.01); *H04W 12/06* (2013.01); *H04W 76/10* (2018.02); *H04W 84/12* (2013.01); *H04W 84/18* (2013.01)

(58) Field of Classification Search
    CPC ............. H04W 12/08; H04W 12/0802; H04W 12/0804; H04W 12/0806; H04W 12/0808; H04W 76/10–19; H04W 84/18; H04W 84/12; H04L 9/32; H04L 63/0428; H04L 63/08; H04L 63/0853; H04L 63/20; H04L 2209/80; H04L 9/3226; H04L 63/0807
    See application file for complete search history.

(56) References Cited

U.S. PATENT DOCUMENTS

| | | | |
|---|---|---|---|
| 6,119,230 | A | 9/2000 | Carter |
| 6,453,687 | B2 | 9/2002 | Sharood et al. |
| 6,891,838 | B1 | 5/2005 | Petite et al. |
| 7,161,483 | B2 | 1/2007 | Chung |
| 7,668,532 | B2 | 2/2010 | Shamoon et al. |
| 8,132,020 | B2 | 3/2012 | Zhu et al. |
| 8,732,318 | B2 | 5/2014 | Seglas et al. |
| 8,789,156 | B2 | 7/2014 | Fisk et al. |
| 8,959,331 | B2 | 2/2015 | Chastain et al. |
| 9,009,811 | B2 | 4/2015 | Ebrom et al. |
| 9,154,297 | B2 | 10/2015 | Wendling |
| 9,237,141 | B2 | 1/2016 | Logue et al. |
| 9,419,799 | B1* | 8/2016 | Chung ................. H04L 9/3247 |
| 9,449,164 | B2 | 9/2016 | Ramallo et al. |
| 9,584,335 | B1* | 2/2017 | Malasani ............ H04L 12/2827 |
| 9,584,520 | B2 | 2/2017 | Logue et al. |
| 9,641,521 | B2 | 5/2017 | Egan et al. |
| 9,686,076 | B2 | 6/2017 | Hauck et al. |
| 2003/0115467 | A1 | 6/2003 | Aull et al. |
| 2007/0254630 | A1 | 11/2007 | Moloney et al. |
| 2008/0250478 | A1* | 10/2008 | Miller .................. H04W 12/08 726/5 |
| 2010/0115278 | A1* | 5/2010 | Shen ..................... H04L 63/061 713/171 |
| 2012/0239916 | A1* | 9/2012 | Malasani .............. H04W 12/50 713/1 |
| 2013/0212660 | A1 | 8/2013 | Neafsey et al. |
| 2014/0328250 | A1* | 11/2014 | Hardy ................. H04W 12/068 370/328 |
| 2016/0127372 | A1 | 5/2016 | Unterschuetz |
| 2016/0192196 | A1* | 6/2016 | Ranade ................. H04W 12/04 726/3 |
| 2016/0269901 | A1* | 9/2016 | Cao ........................ H04L 9/3226 |
| 2018/0092138 | A1* | 3/2018 | Tang ..................... H04W 76/38 |

OTHER PUBLICATIONS

Steiner et al., "Kerberos: An Authentication Service for Open Network Systems," Usenix Winter, Mar. 30, 1988.

Jeong et al., "Secure User Authentication Mechanism in Digital Home Network Environments," EUC '06 Proceedings of the 2006 International Conference on Embedded and Ubiquitous Computing, Aug. 1-4, 2006, pp. 345-354.

Adoba et al., "The Network Access Identifier," Standards Track, Dec. 2005.

\* cited by examiner

NETWORK AUTHENTICATION VIA ENCRYPTED NETWORK ACCESS PACKAGES

BACKGROUND

Routers can provide authenticated network access to user devices based, at least in part, upon one or more authentication mechanisms, such as, for example, login credentials (local or browser-based), keys, passcodes, white-lists, black-lists, automated setup mechanisms (e.g., Wi-Fi Protected Setup), or some combination thereof. All of these authentication mechanisms require efforts by both the network provider and the user requesting access to the network. For example, a browser-based login might require the network provider to setup and maintain a login portal, and the user might be required to sign up with the network provider, remember his or her login credentials, and sign-in using the login credentials prior to gaining access to the network.

It is a common practice for the network owner/provider to print, email, or otherwise share login credentials with potential users. This practice is highly insecure. In addition, the manual entry of login credentials, keys, passcodes, and/or other authentication credentials is prone to user error. White-lists and black-lists can simplify the authentication process for users, but establishing and maintaining such lists requires time, attention, and manual control by the network owner/provider. Automated setup mechanisms typically require users to have physical access to both the router and the user's device. This requirement exposes a security flaw that allows anyone with physical access to the router to gain access to the network. All of these authentication mechanisms exhibit usability concerns and/or security flaws.

SUMMARY

Concepts and technologies disclosed herein are directed to network authentication via encrypted network access packages. According to one aspect of the concepts and technologies disclosed herein, a provider device includes a processor and memory. The memory includes computer-executable instructions that, when executed by the processor, cause the processor to perform operations. In particular, the provider device can receive, from a requester device, a network access request requesting, on behalf of the requester device, access to a Wi-Fi network associated with a network provider. The Wi-Fi network is provided, at least in part, by a network device. In response to the network access request, the provider device can prompt the network provider to accept or deny the requester device access to the Wi-Fi network. The provider device can receive input indicating that the network provider accepts the network access request. In response to the input indicating that the network provider accepts the network access request, the provider device can create a network access response. The network access response can include a network access package that, in turn, can include a secure network access configuration to be utilized by the network device to establish, at least in part, a secure connection with the requester device to provide the requester device access to the Wi-Fi network in accordance with the secure network access configuration. The provider device can send the network access response to the requester device.

In some embodiments, the provider device can present a user interface served by the network device. The user interface can allow the network provider to define the secure network access configuration for the network access package. The provider device can receive, via the user interface, further input to define the secure network access configuration for the network access package. In some embodiments, the user interface is or includes a web interface. Alternatively, in other embodiments, the user interface is or includes a native application interface. In some embodiments, the secure network access configuration can be a default configuration tagged as default by the network provider (e.g., via the user interface). In other embodiments, the secure network access configuration can be a customer configuration specific to the requester device. The secure network access configuration can include at least one rule specifying at least one condition under which the requester device is permitted to access the Wi-Fi network.

According to another aspect of the concepts and technologies disclosed herein, a requester device includes a processor and memory. The memory includes computer-executable instructions that, when executed by the processor, cause the processor to perform operations. In particular, the requester device can generate a network access request requesting access to a Wi-Fi network associated with a network provider. The Wi-Fi network can be provided, at least in part, by a network device. The requester device can send the network access request to a provider device associated with the network provider. The requester device can receive, from the provider device, an encrypted network access package. The encrypted network access package can include a secure network access configuration to be utilized by the network device to establish, at least in part, a secure connection with the requester device to provide the requester device access to the network. The requester device can establish, with the network device, an unsecure connection. The requester device can send, via the unsecure connection, the encrypted network access package to the network device. The network device can decrypt the encrypted network access package to extract the secure network access configuration. The requester device can establish, with the network device, the secure connection in accordance with the secure network access configuration.

In some embodiments, the requester device can receive the encrypted network access package in a network access response. The network access response also can include an indication that the network access request was accepted. In response to the indication that the network access request was accepted, the requester device can present a notification to inform a user of the requester device that the network access request was accepted. In some embodiments, the requester device can store the encrypted network access package in the memory.

In some embodiments, when the requester device is within range of the Wi-Fi network, the requester device can detect, via a Wi-Fi communications component, a signal from the Wi-Fi network. In these embodiments, the unsecure connection can be established in response to the requester device detecting, via the Wi-Fi communications component, the signal from the Wi-Fi network. The unsecure connection, in some embodiments, can be an ad-hoc peer-to-peer connection between the requester device and the network device. In other embodiments, the unsecure connection can be a dedicated connection for exchanging encrypted network access packages such as the encrypted network access package.

According to another aspect of the concepts and technologies disclosed herein, a network device includes a processor and memory. The memory includes computer-executable instructions that, when executed by the processor, cause the processor to perform operations. In particular, the network device can present a user interface through which a network provider can configure a network access package. The network access package can include a secure network access configuration to be utilized by the network device to establish, at least in part, a secure connection with a requester device to provide the requester device access to the Wi-Fi network. The network device can receive, via the user interface, input to define the secure network access configuration. The network device can create, based upon the input, the network access package that includes the secure network access configuration.

In some embodiments, the user interface includes a web interface or a native application interface. The user interface can include a plurality of configuration parameters that are selectable by the network provider to define the secure network access configuration. In some embodiments, the secure network access configuration includes at least one rule specifying at least one condition under which the requester device is permitted to access the Wi-Fi network. The rule(s) can be defined, at least in part, via the input that defines at least a portion of the plurality of configuration parameters.

In some embodiments, the network device can include a cryptographic module that is executable by the processor to cause the processor to encrypt the network access package to create an encrypted network access package. The encrypted network access package can only be decrypted by the network device to provide the requester device access to the Wi-Fi network in accordance with the secure network access configuration.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
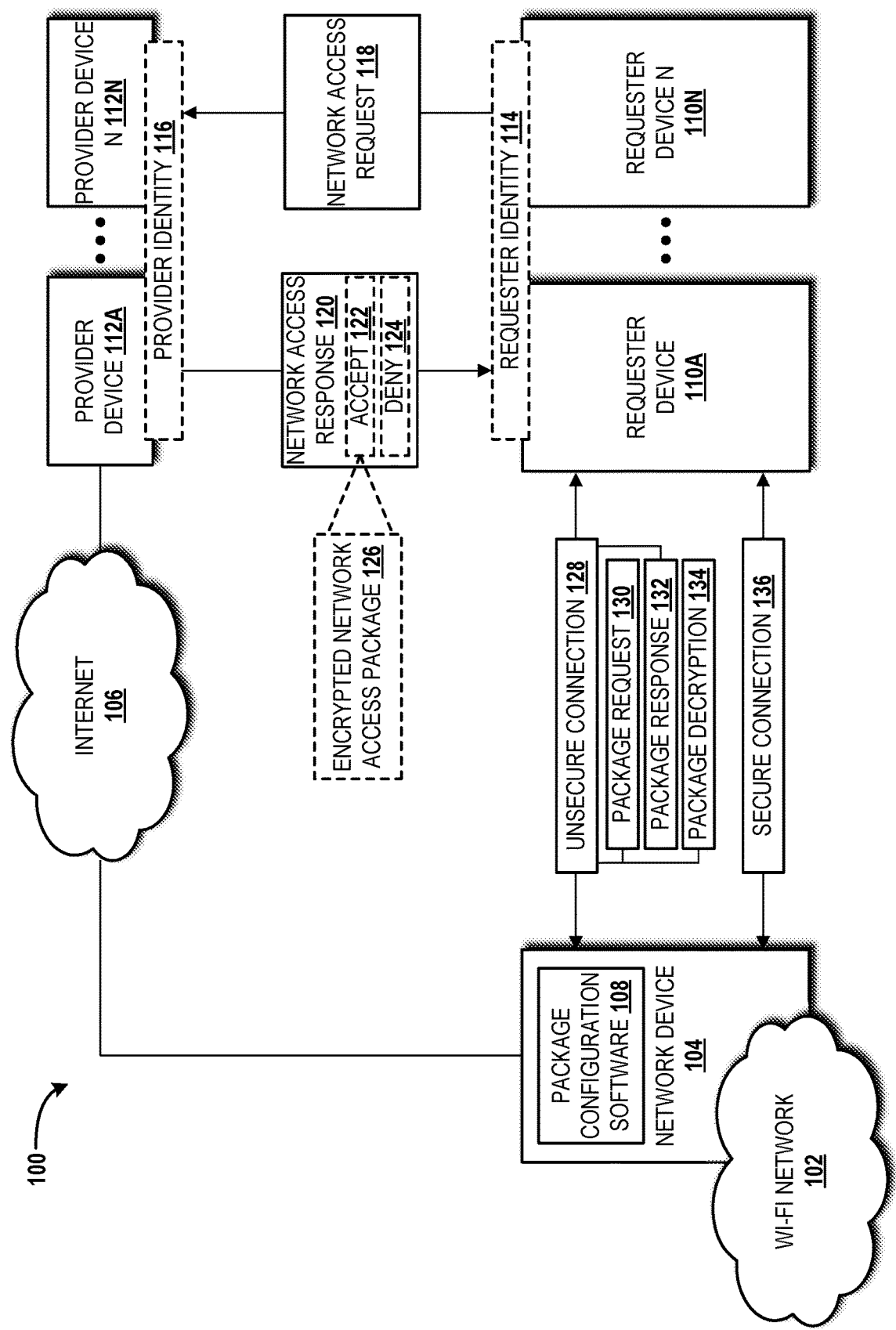
FIG. 1 is a block diagram illustrating aspects of an illustrative operating environment for various concepts disclosed herein.

Concepts and technologies disclosed herein are directed to network authentication via encrypted network access packages. According to one aspect of the concepts and technologies disclosed herein, a network provider can create, configure, and manage network access packages to provide authenticated access to one or more Wi-Fi networks. A user (also referred to herein as a requester) can request, from the network provider, access to the Wi-Fi network(s) via his or her device (also referred to herein as a requester device), such as a smartphone, tablet, computer, or any other device capable of communication with the Wi-Fi network(s) via one or more networking protocols, including, for example, IEEE 802.11 Wi-Fi protocols. In response to the request, the network provider can receive a notification on a provider device, which might be a mobile device such as a smartphone, tablet, or the like, that can prompt the network provider to either accept or deny the request for access to the Wi-Fi network. If the network provider accepts the request, a network device that serves the Wi-Fi network can create a network access package. The network access package can include a secure network access configuration to be used by the network device to configure, for the requester device, network access to the Wi-Fi network. For example, the network access package can include rules specifying time limits, network proximity and re-entry, port access, IP address range, throttling, download/upload data limit, download/upload time, misbehavior tolerance, combinations thereof, and the like. In this manner, the network provider has a robust set of configurable parameters that can be used to define rules that can be assigned to each requester device requesting access to the Wi-Fi network. The network provider can configure a default network access package that is easily selectable in response to requests for network access or can customize a package on-the-fly via a graphical user interface ("GUI").

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Turning now to FIG. 1, a block diagram illustrating aspects of an operating environment 100 in which the concepts and technologies disclosed herein can be implemented will be described. The illustrated operating environment 100 includes a Wi-Fi network 102 provided, at least in part, by a network device 104. The network device 104 can operate in accordance with any IEEE 802.11 ("Wi-Fi") standard(s) to provide the Wi-Fi network 102. In some embodiments, the network device 104 is a Wi-Fi access point. In other embodiments, the network device 104 is a router that includes a Wi-Fi access point. The network device 104 additionally can include one or more internal modems, each of which can provide connectivity to one or more wide area networks ("WANs") to facilitate communications with one or more other networks, including the Internet 106, for example. Alternatively, the network device 104 can be connected to one or more external modems. WAN connectivity for the modem(s) can be implemented via one or more wireline (e.g., fiber optic, coaxial, and the like) and/or wireless networks (e.g., cellular networks and/or Wi-Max networks). Those skilled in the art will appreciate the numerous configurations of network connectivity among the Wi-Fi network 102, the network device 104, and the Internet 106, and as such, the examples disclosed herein are merely intended to describe common configurations and do not limit the scope of the concepts and technologies disclosed herein.

The network device 104 can be owned and/or operated by a network provider, which might be an individual, a business, or other entity associated with providing the Wi-Fi network 102. For example, the network provider might be a home owner or other individual who subscribes to Internet service through an Internet Service Provider ("ISP;" not shown) and rents, purchases, or is provided, by the ISP, the network device 104. Alternatively, the network provider might be the ISP itself. In other words, the network provider can be any entity that has access privileges to the network device 104 to control, at least in part, operation of the network device 104 in providing the Wi-Fi network 102, and in particular, access to the network device 104 to interact with a package configuration software 108 that can be executed by one or more processors (best shown in FIG. 2) of the network device 104 to provide some of the functionality described herein. For ease of description, and not limitation, the network device 104 will be described as a Wi-Fi router that includes at least one Wi-Fi transceiver and at least one antenna that provide, at least in part, wireless access to Wi-Fi-capable devices via the Wi-Fi network 102, and at least one embedded WAN modem that provides connectivity to one or more WANs capable of accessing the Internet 106.

The package configuration software 108 allows a network provider to create and manage digital packages referred to herein as "network access packages" that include secure network access configuration information to be used by the network device 104 to configure network access devices visiting the Wi-Fi network 102. The visiting devices, in the illustrated example, are referred to as requester devices 110A-110N (hereinafter, "requester device(s) 110"). The secure network access configuration information can include one or more configuration parameters, such as, for example, time limits, network proximity and re-entry, port access, IP address range, throttling, download/upload data limit, download/upload time, misbehavior tolerance, combinations thereof, and the like. In this manner, the network provider has a robust set of configurable parameters that can be used to define rules that can be assigned to the requester device(s) 110 requesting access to the Wi-Fi network 102. Those skilled in the art will appreciate that the secure network access configuration information can include any configuration parameter that relates a requester device 110 with its access to the Wi-Fi network 102. As such, the particular example configuration parameters described above are merely exemplary of some configuration parameters that might be used in a typical implementation of the concepts and technologies disclosed herein, and do not limit, in any way, the scope thereof.

The functionality of the requester devices 110 can be provided by smartphones, tablets, computers, Internet of Things ("IoT") devices, vehicle computing systems, global positioning system ("GPS") receivers, GPS navigation devices, wearable computing systems, embedded computing devices for appliances or other systems or structures, smart watches and other "smart" devices, point-of-sale devices, headwear and/or eyewear, augmented reality ("AR") devices, virtual reality ("VR") devices, audio systems, video systems, video game systems, combinations thereof, and/or the like. In general, the requester devices 110 are Wi-Fi capable, and thus are capable of communicating with the network device 104 to access the Wi-Fi network 102. The network access packages created by the network provider via the package configuration software 108 executed by the network device 104 configure this communication in accordance with the network provider's requested configuration parameters provided via one or more provider devices 112A-112N (hereinafter, "provider device(s) 112"). The functionality of the provider devices 112 can be provided by any of the aforementioned devices or systems described with reference to the functionality of the requester devices 110. In the illustrated example, the provider device 112 is in communication with the Internet 106. The provider device 112 can communicate with the Internet 106 that, in turn, is in communication with the network device 104. In this manner, the provider device 112 can remotely access the network device 104 to operate the package configuration software 108. Alternatively, the provider device 112 can communicate directly with the network device 104 via a wireline connection, via the Wi-Fi network 102, and/or via another network such as a personal area network (e.g., BLUETOOTH) or an ad-hoc Wi-Fi network, for example.

The requester devices 110 are shown in association with a requester identity 114. The requester identity 114 can be or can include a unique identifier that uniquely identifies a requester (also referred to herein as a "user") and associates the requester with a particular one or more of the requester devices 110. For example, the requester identity 114 can include a telephone number, an email address, a user name, a user ID, a persona, and/or the like. The requester identity 114 also can be associated with a media access control ("MAC") address or other hardware identifier of the requester device(s) 110.

The provider devices 112 are shown in association with a provider identity 116. The provider identity 116 can be or can include a unique identifier that uniquely identifies a network provider (e.g., the owner and/or operator of the network device 104) and associates the network provider with a particular one or more of the provider devices 112. For example, the provider identity 116 can include a telephone number, an email address, a user name, a user ID, a persona, and/or the like. The requester identity 114 can be associated with a MAC address or other hardware identifier of the provider device(s) 112.

The requester device 110 can generate a network access request 118 to request, from the network provider, access to the Wi-Fi network 102. The network access request 118 can include, at minimum, an identifier of the device and/or person requesting access (e.g., the requester identity 114). The network access request 118 can optionally include a time-frame for requested access, acceptable max/min bitrates, which band(s) (e.g., in a multi-band Wi-Fi network), and/or other auxiliary information related to how the device would get provisioned onto the target network (e.g., the Wi-Fi network 102).

Moreover, the requester does not need to know the service set identifier ("SSID"), or any other information about the target network. The requester might know the SSID/physical address of the router (the physical address can be obtained when the requester is in range and knows the SSID) in one embodiment in which the system described herein can be implemented. It should be understood, however, that an advantage of the disclosed system is that the requester does not need to know anything other than from whom or from where s/he is requesting network access through the requester device 110. For example, the requester can pick a network provider s/he knows or a location on a map to which s/he is going. The requester device 110 can access a database or other data store to pull relevant data for the target network(s) associated with the network provider and/or the location. Based upon this information, the requester device 110 can determine which access point/router the requester device 110 should access, and then the requester device 110 can request access via the network access request 118.

The requester device 110 can send the network access request 118 to the provider device 112. The provider device 112 can receive the network access request 118 and can prompt the network provider to accept or deny the network access request 118. The provider device 112 can receive input from the network provider indicating acceptance or denial of the network access request 118. Responsive to this input, the provider device 112 can generate a network access response 120, including either an accept message ("accept") 122 or a denial message ("deny") 124 to inform the requester of the acceptance or denial of the network access request 118. In addition to the accept message 122, the provider device 112 can include an encrypted network access package 126 created by the network device 104, on behalf of the network provider, for the requester device 110.

In some embodiments, the provider identity 116 can be indirectly provided to the requester device 110. The requester device 110 can access a "lookup" function that leverages social media data, enterprise data, and any data/relationships explicitly set up by the network provider. For example, the requester device 110 can access the lookup function and provide a lookup query with language such as "I want to access John's Wi-Fi tomorrow when in proximity of John's Wi-Fi network." The provider device 112 can create the network access response 120, including the accept message 122 and the encrypted network access package 126 that includes all details of the relationship between "John" and any AP/router (e.g., the network device 104) to be provisioned.

In response to the network access request 118, the requester device 110 can receive the network access response 120 from the provider device 112. The requester device 110 can analyze the network access response 120 and can determine whether the network access response 120 includes the encrypted network access package 126. If the requester device 110 determines that the network access response 120 does not include the encrypted network access package 126, the requester device 110 can present a notification to inform the requester that the network access request 118 was denied. If, however, the requester device 110 determines that the network access response 120 includes the encrypted network access package 126, the requester device 110 can present a notification to inform the requester that the network access request 118 was accepted. In addition, the requester device 110 can store the encrypted network access package 126 in memory (best shown in FIG. 8).

The requester device 110 then can monitor a Wi-Fi communications component (also best shown in FIG. 8) for a Wi-Fi signal generated by the network device 104. When the requester device 110 detects a Wi-Fi signal generated by the network device 104, the requester device 110 can establish, in part, an unsecure connection 128 with the network device 104. The unsecure connection 128 can be a Wi-Fi connection to the network device 104 via an SSID configured for package management, a guest SSID, an ad-hoc peer-to-peer connection, or the like. The requester device 110 can receive, from the network device 104, a package request 130. The package request 130 prompts the requester device 110 to provide the encrypted network access package 126 received from the provider device 112 in the network access response 120. In reply to the package request 130, the requester device 110 can generate a package response 132, including the encrypted network access package 126, and can send the package response 132 to the network device 104 via the unsecure connection 128. The network device 104 can receive the package response 132 and extract the encrypted network access package 126. The network device 104 then performs package decryption 134 using one or more decryption keys. Upon successful decryption, the network device 104 can grant the requester device 110 access to the Wi-Fi network 102 in accordance with the secure network access configuration included in the encrypted network access package 126. The requester device 110 and the network device 104 then can establish a secure connection 136 based upon the secure network access configuration. The secure connection 136 can be torn down in accordance with any time limits, data limits, and/or other rules specified in the secure configuration.

FIG. 1 illustrates one Wi-Fi network 102, one network device 104, one Internet 106, one package configuration software 108, one requester identity 114, one provider entity 116, one network access request 118, one network access response 120, one accept message 122, one deny message 124, one encrypted network access package 126, one unsecure connection 128, one package request 130, one package response 132, one package decryption 134, and one secure connection 136. It should be understood, however, that some implementations of the operating environment 100 can include multiples of one or more of these elements shown in FIG. 1. As such, the illustrated embodiment of the operating environment 100 should be understood as being illustrative, and should not be construed as being limiting in any way.

Figure 2:
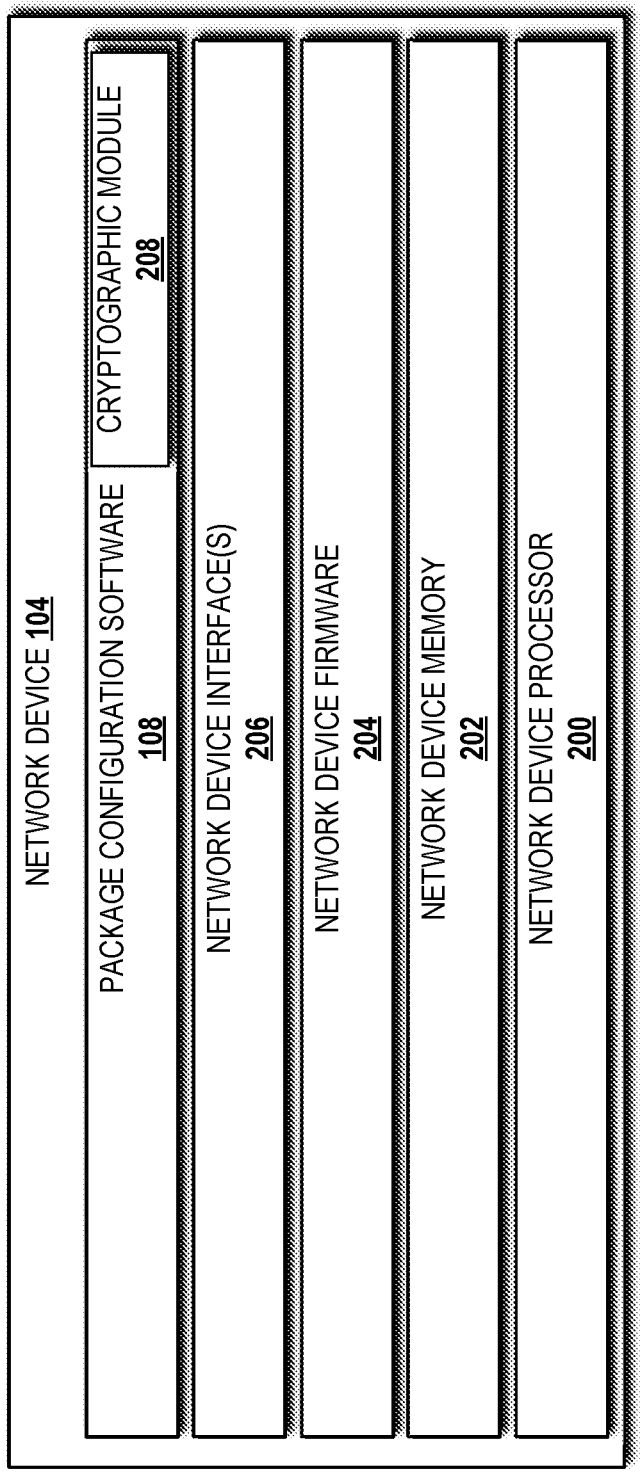
FIG. 2 is a block diagram illustrating aspects of a network device, according to an illustrative embodiment of the concepts and technologies disclosed herein.

Turning now to FIG. 2, a block diagram illustrating additional aspects of the network device 104 will be described, according to an illustrative embodiment of the concepts and technologies disclosed herein. The illustrated network device 104 includes a network device processor 200, a network device memory 202, a network device firmware 204, one or more network device interfaces 206, and the package configuration software 108. While connections are not shown between the various hardware components illustrated in FIG. 2, it should be understood that some, none, or all of the components illustrated in FIG. 2 can be configured to interact with one other to carry out various device functions. In some embodiments, the hardware components are arranged so as to communicate via one or more busses (not shown). Thus, it should be understood that FIG. 2 and the following description are intended to provide a general understanding of a suitable environment in which various aspects of embodiments can be implemented, and should not be construed as being limiting in any way.

The network device processor 200 can include one or more hardware components that perform computations to calculate routes, process data, and/or to execute computer-executable instructions of one or more application programs (e.g., an application program that includes the package configuration software 108 or the package configuration software 108 implemented as a standalone application program), one or more operating systems (e.g., implemented as part of the network device firmware 204), and/or other software. The network device processor 200 can include one or more central processing units ("CPUs") configured with one or more processing cores. The network device processor 200 can include one or more graphics processing units ("GPUs") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the network device processor 200 can include one or more discrete GPUs. In other embodiments, the network device processor 200 can include CPU and GPU components that are configured in accordance with a co-processing CPU/GPU computing model, wherein the sequential part of an application executes on the CPU and the computationally-intensive part is accelerated by the GPU. The network device processor 200 can include one or more field-programmable gate arrays ("FPGAs"). The network device processor 200 can include one or more system-on-chip ("SoC") components along with one or more other components, including, for example, the network device memory 202, and/or one or more of the other components of the network device 104 such as the network device interface(s) 206. In some embodiments, the network device processor 200 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The network device processor 200 can be or can include one or more hardware components architected in accordance with an ARM architecture, available for license from ARM HOLDINGS of Cambridge, United Kingdom. Alternatively, the network device processor 200 can be or can include one or more hardware components architected in accordance with an x86 architecture, such an architecture available from INTEL CORPORATION of Mountain View, Calif., and others.

Those skilled in the art will appreciate the implementation of the network device processor 200 can utilize various computation architectures, and as such, network device processor 200 should not be construed as being limited to any particular computation architecture or combination of computation architectures, including those explicitly disclosed herein.

The network device memory 202 can include one or more hardware components that perform storage operations, including temporary and/or permanent storage operations. In some embodiments, the network device memory 202 include volatile and/or non-volatile memory implemented in any method or technology for storage of information such as computer-readable instructions, data structures, the network device firmware 204, the package configuration software 108, and/or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the network device processor 200.

The network device firmware 204 can control the operation of the network device 104. In some embodiments, the network device firmware 204 includes the functionality of the package configuration software 108. The network device firmware 204 can be executed by the network device processor 200 to cause the network device 104 to perform various operations described herein. In some embodiments, the network device firmware 204 is based on an operating system distribution, such as Unix, Linux, or BSD. Proprietary, open source, and other firmware types are contemplated.

The network device interfaces 206 can be or can include one or more networking interfaces that provide network traffic connectivity between the Wi-Fi network 102 and devices, such as the provider device 112 and the requester device 110. The network device interfaces 206 can be or can include one or more service interfaces that provide specific functions to manipulate traffic to/from the Wi-Fi network 102, such as deep packet inspection ("DPI"), intrusion detection and/or prevention, firewall, combinations thereof, and/or the like. The network device interfaces 206 can be or can include one or more container interfaces that provide virtualized interfaces that can be instantiated on-demand. The network device interfaces 206 can include one or more physical interfaces, including Ethernet IEEE 802.3 standard variants for wired connections and Wi-Fi IEEE 802.11 standard variants for wireless connections. The network device interfaces 206 additionally or alternatively can include one or more virtual interfaces. In some embodiments, the network device 104 is upgradeable via software/firmware updates and/or adding additional physical interfaces. The network device interfaces 206 can be permanent or temporary.

The package configuration software 108 allows a network provider to create and manage network access packages that include secure network access configuration information to be used by the network device 104 to configure network access for the requester device 110. Prior to sending a network access package to the provider device 112, the network device 104 can encrypt the network access package utilizing a cryptographic module 208. Upon receipt of an encrypted network access package 126 from a requester device 110, such as in the example illustrated in FIG. 1, the package configuration software 108 can execute the cryptographic module 208 to decrypt the network access package 126 to extract the secure network access configuration to be used by the network device 104 to configure network access for the requester device 110. The cryptographic module 208 can implement any encryption and decryption algorithm to perform the encryption and decryption operations disclosed herein.

Figure 3:
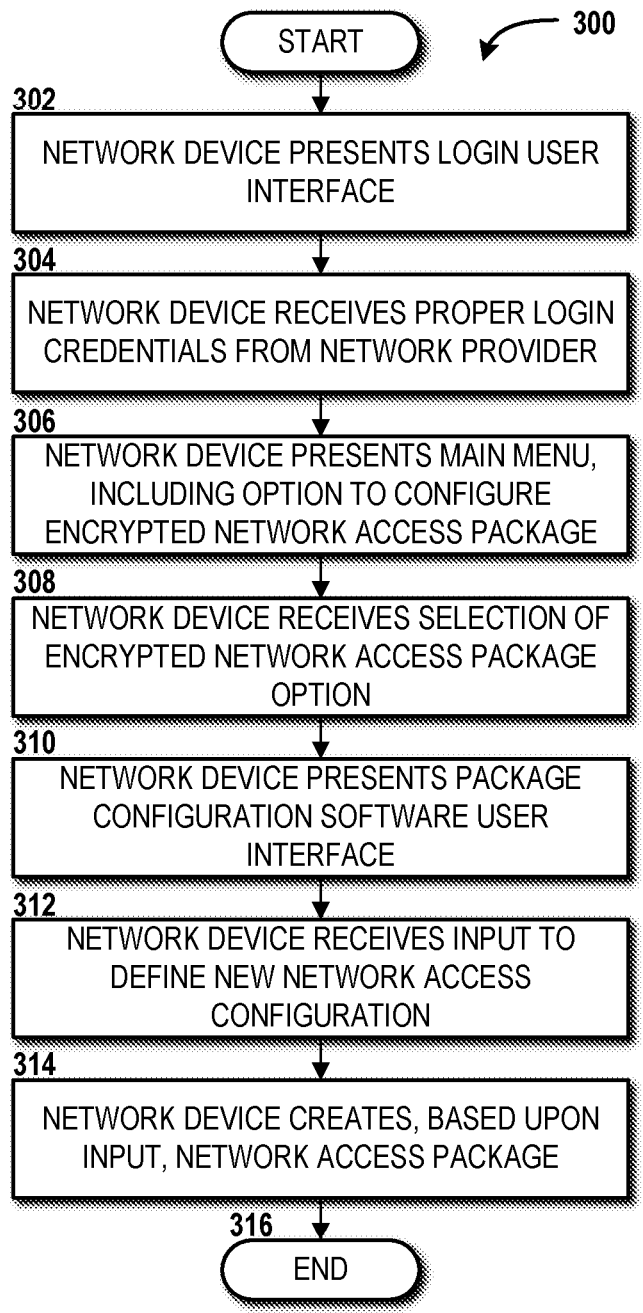
FIG. 3 is a flow diagram illustrating aspects of a method for operating a network device, according to an illustrative embodiment of the concepts and technologies disclosed herein.

Turning now to FIG. 3, aspects of a method 300 for operating the network device 104 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor such as the network device processor 200 or other processing component(s) disclosed herein to perform operations. It should be understood that the performance of one or more operations may include operations executed by one or more virtual processors at the instructions of one or more of the aforementioned hardware processors.

Figure 4A:
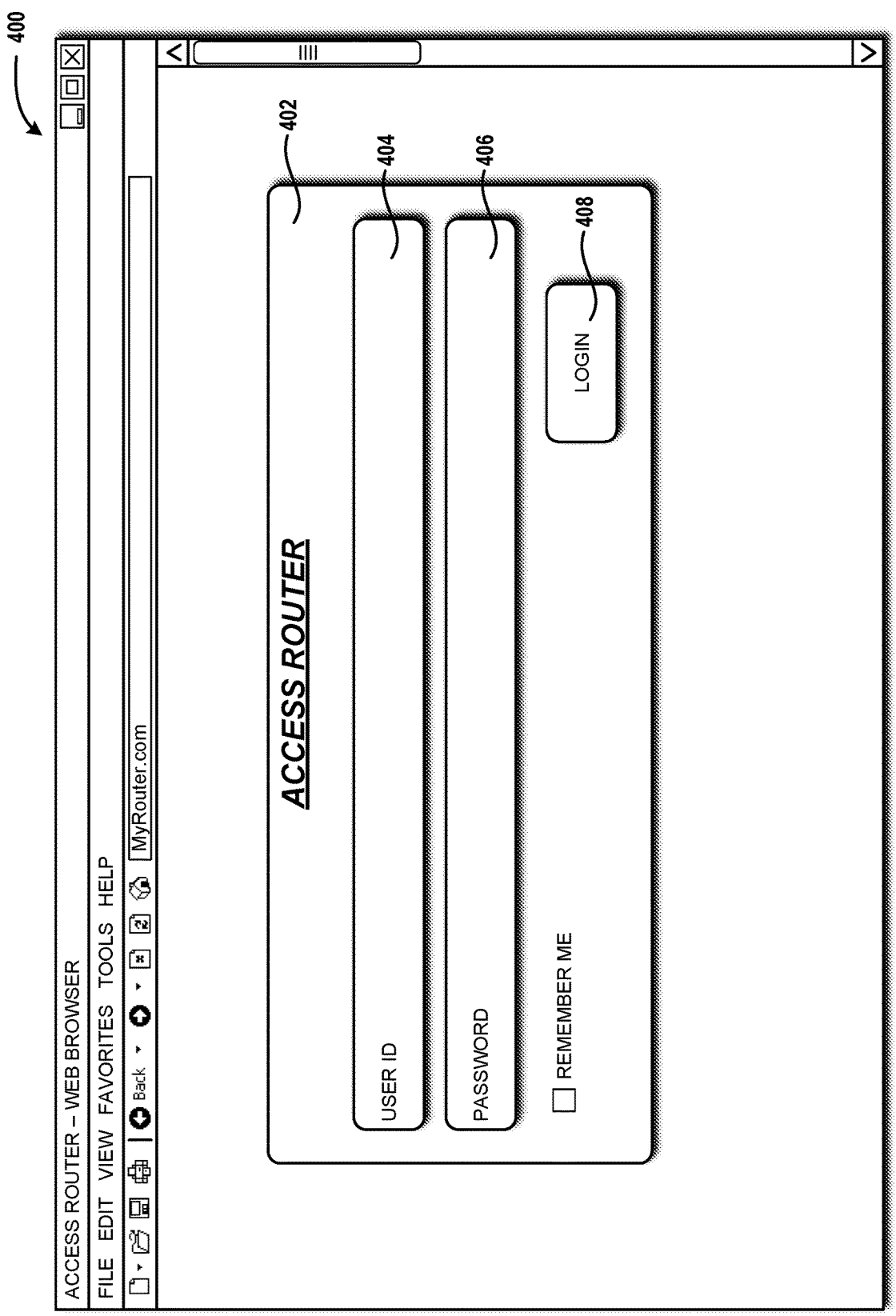
FIGS. 4A-4C are user interface diagrams illustrating a GUI through which a network provider can access functions of a network device embodied as a router, according to an illustrative embodiment of the concepts and technologies disclosed herein.

The method 300 will be described with reference to FIG. 3 and further reference to FIGS. 1, 2, and 4A-4C. The description of the method 300 assumes that the network provider has accessed, via a web browser executed by the provider device 112, a GUI provided, at least in part, by the package configuration software 108. According to embodiments, the GUI includes a login user interface 402. Turning briefly to FIG. 4A, a web browser instance 400 is shown displaying the login user interface 402. The login user interface 402 includes a user ID entry field 404 and a password entry field 406 through which the network provider can enter a user ID and a password, respectively. The login user interface 402 also includes a login button 408, which can be selected by the network provider to submit the user ID and the password. The login user interface 402 might require additional or alternative authentication credentials to allow the network provider access to the network device firmware 204 in general and the package configuration software 108 in particular. Returning to FIG. 3, the method 300 begins and proceeds to operation 302, where the network device 104 presents the login user interface 402. From operation 302, the method 300 proceeds to operation 304, where the network device 104 receives proper login credentials in the user ID entry field 404 and the password entry field 406 and receives selection of the login button 408.

Figure 4B:
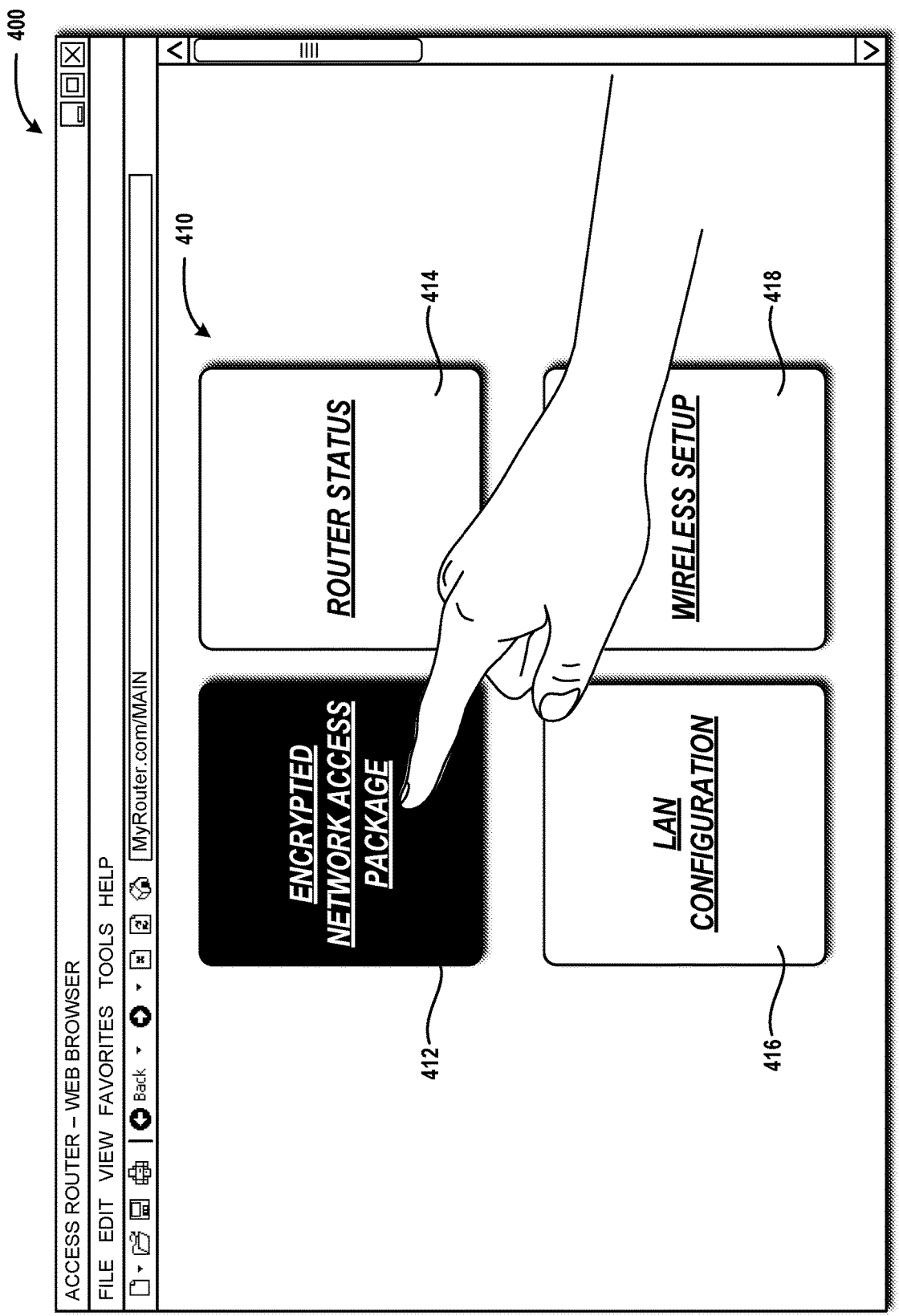

From operation 304, the method 300 proceeds to operation 306, where the network device 104 presents a main menu user interface 410 such as in the example shown in FIG. 4B. The illustrated main menu user interface 410 includes a plurality of menu options to access various router functions. In the illustrated example, the plurality of menu options includes an Encrypted Network Access Package option 412, a Router Status option 414, a LAN Configuration option 416, and a Wireless Setup option 418. The Router Status option 414, the LAN Configuration option 416, and the Wireless Setup option 418 are representative of options typically available in existing router firmware, and therefore, will not be described in further detail. The Encrypted Network Access Package option 412 provides the network provider access to new functionality to configure encrypted network access packages, including creating new encrypted network access packages, modifying existing encrypted network access packages, establishing default encrypted network access package, and otherwise interacting with the network device 104 with regard to the network access package functionality described herein. From operation 306, the method 300 proceeds to operation 308, where the network device 104 receives selection of the Encrypted Network Access Package option 412.

Figure 4C:
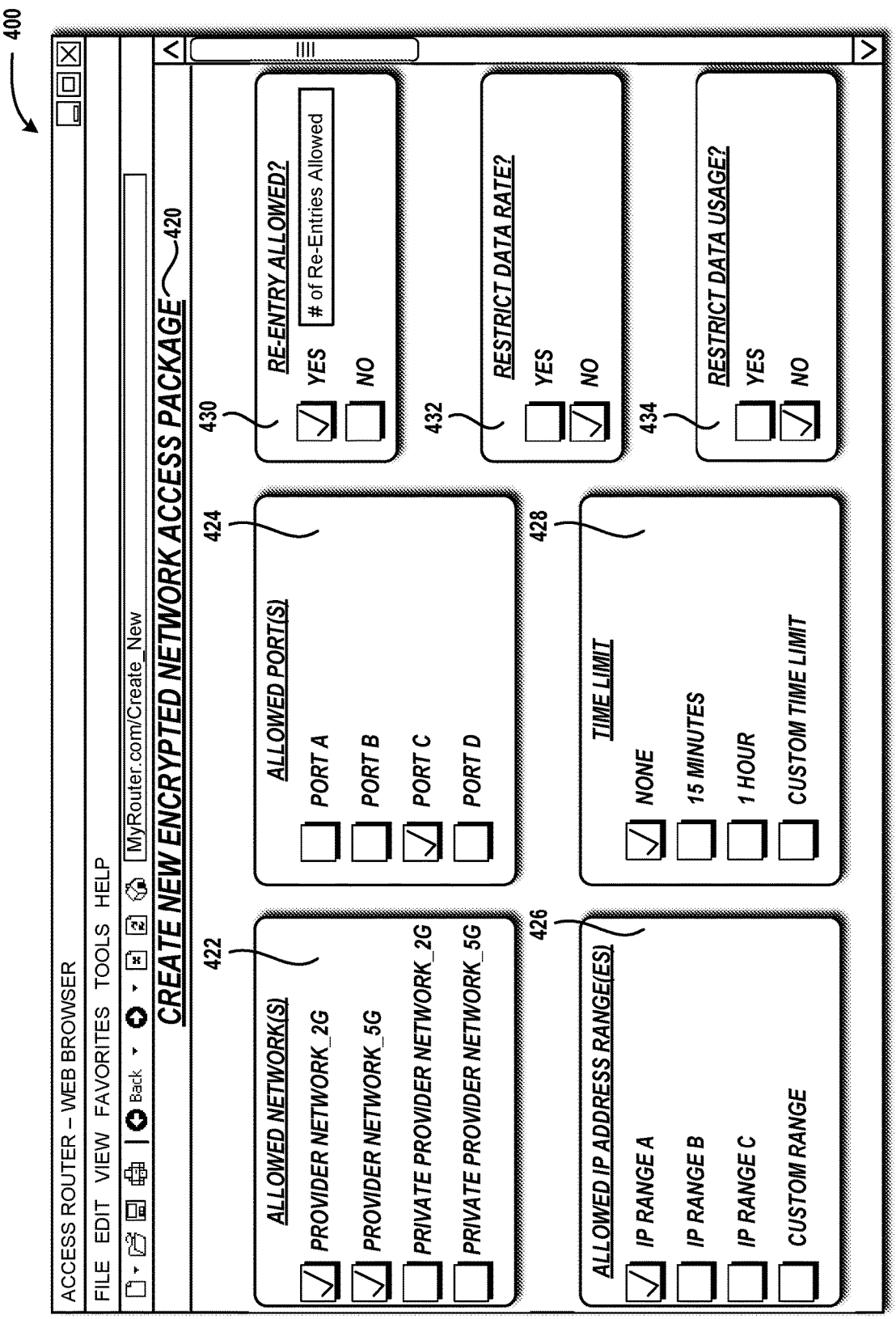

From operation 308, the method 300 proceeds to operation 310, where the network device 104 presents a package configuration software user interface 420 such as in the example shown in FIG. 4C. The illustrated package configuration software user interface 420 includes network access configuration parameters selectable by the network provider to create a new encrypted network access package. The illustrated network access configuration parameters include an allowed network(s) parameter 422, an allowed port(s) parameter 424, an allowed IP address range(s) parameter 426, a time limit parameter 428, a re-entry allowed parameter 430, a restrict data rate parameter 432, and a restrict data usage parameter 434 as shown in FIG. 4C. These parameters are shown as exemplary examples of the possible parameters that a network provider can configure for a given network access package, and therefore should not be construed as being limiting in any way.

From operation 310, the method 300 proceeds to operation 312, where the network device 104 receives input via the package configuration software user interface 420 to define a new network access configuration. From operation 312, the method 300 proceeds to operation 314, where the network device 104 creates, based upon the input received at operation 312, a new network access package. The network device 104 can save the new network access package for later use. From operation 314, the method 300 proceeds to operation 316, where the method 300 ends.

Figure 5A:
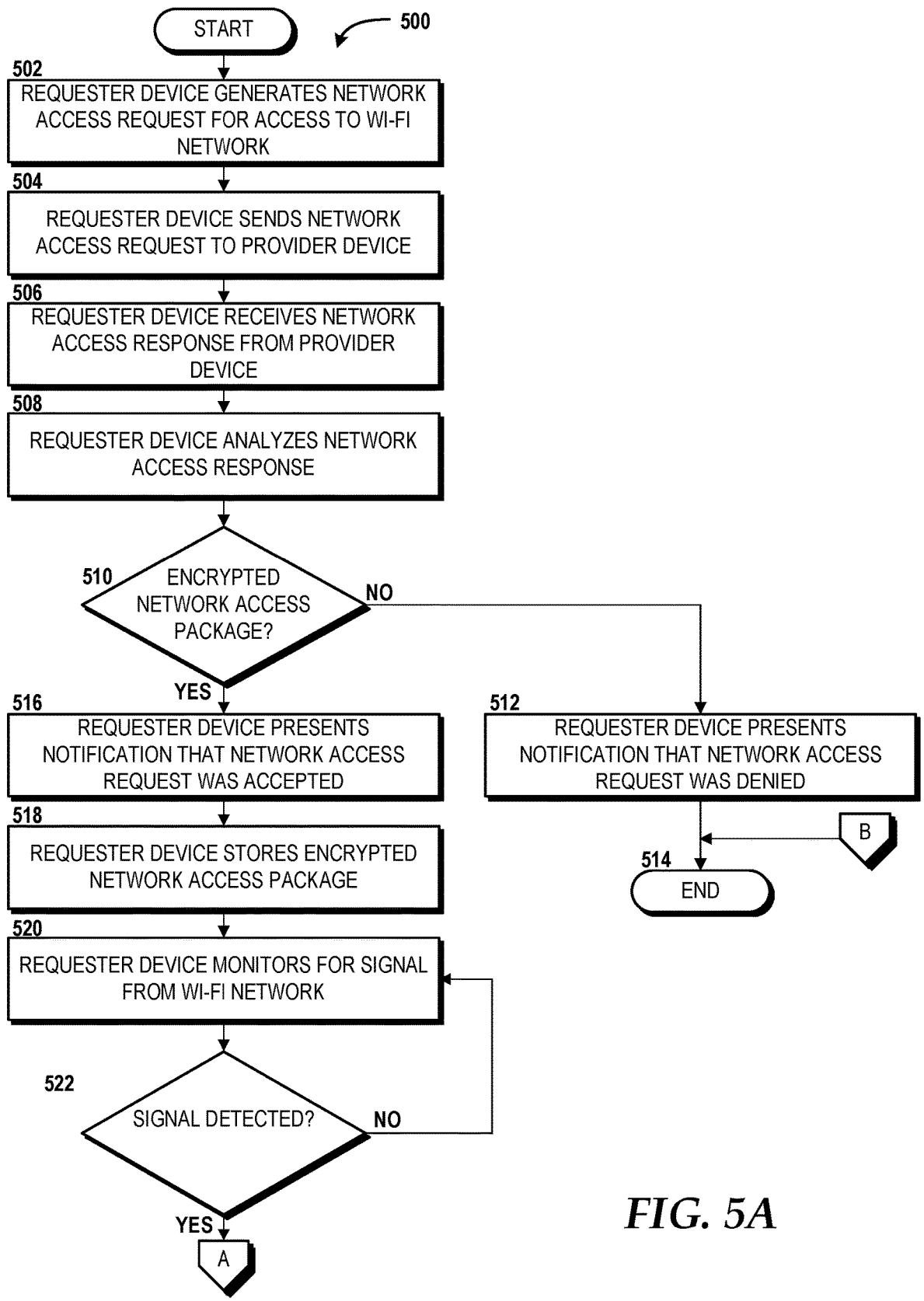
FIGS. 5A-5B are flow diagrams illustrating aspects of a method for operating a requester device, according to an illustrative embodiment of the concepts and technologies disclosed herein.
Figure 5B:
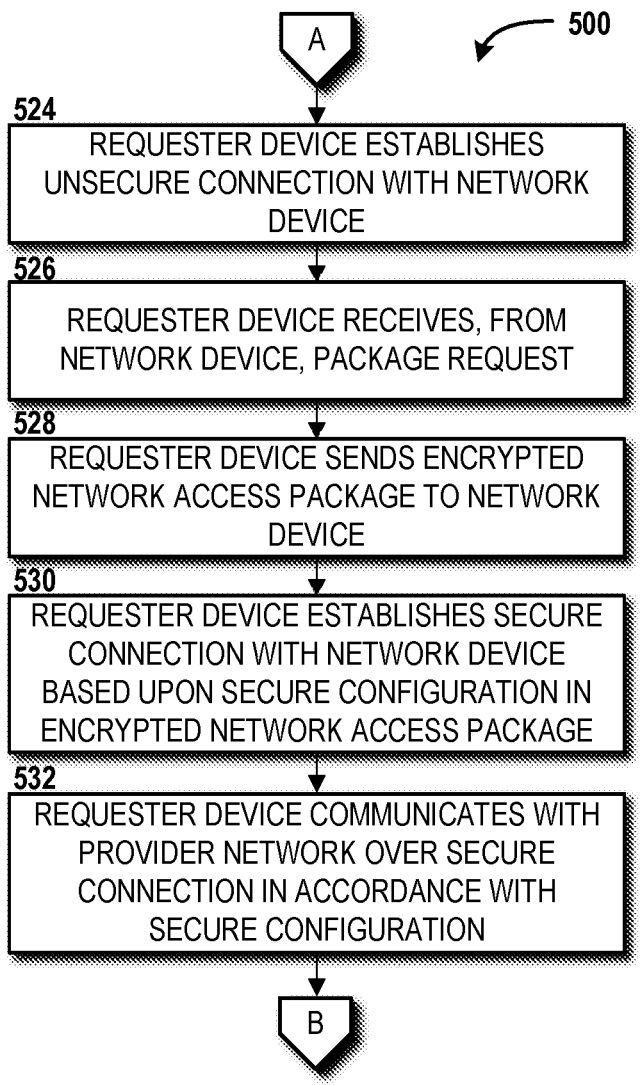

Turning now to FIGS. 5A-5B, a method 500 for operating the requester device 110 will be described, according to an illustrative embodiment of the concepts and technologies disclosed herein. The method 500 will be described with additional reference to FIG. 1. The method 500 begins and proceeds to operation 502, where the requester device 110 generates the network access request 118 to request access to the Wi-Fi network 102. From operation 502, the method 500 proceeds to operation 504, where the requester device 110 sends the network access request 118 to the provider device 112. In response to the network access request 118, the requester device 110 receives, at operation 506, the network access response 120 from the provider device 112.

From operation 506, the method 500 proceeds to operation 508, where the requester device 110 analyzes the network access response 120. From operation 508, the method 500 proceeds to operation 510, where, based upon the analysis performed at operation 508, the requester device 110 determines whether the network access response 120 includes the encrypted network access package 126. If, at operation 510, the requester device 110 determines that the network access response 120 does not include the encrypted network access package 126, the method 500 proceeds to operation 512, where the requester device 110 presents a notification to inform the requester that the network access request 118 was denied. From operation 512, the method 500 proceeds to operation 514, where the method 500 ends. If, however, the requester device 110 determines, at operation 510, that the network access response 120 includes the encrypted network access package 126, the method 500 proceeds to operation 516, where the requester device 110 presents a notification to inform the requester that the network access request 118 was accepted.

Figure 8:
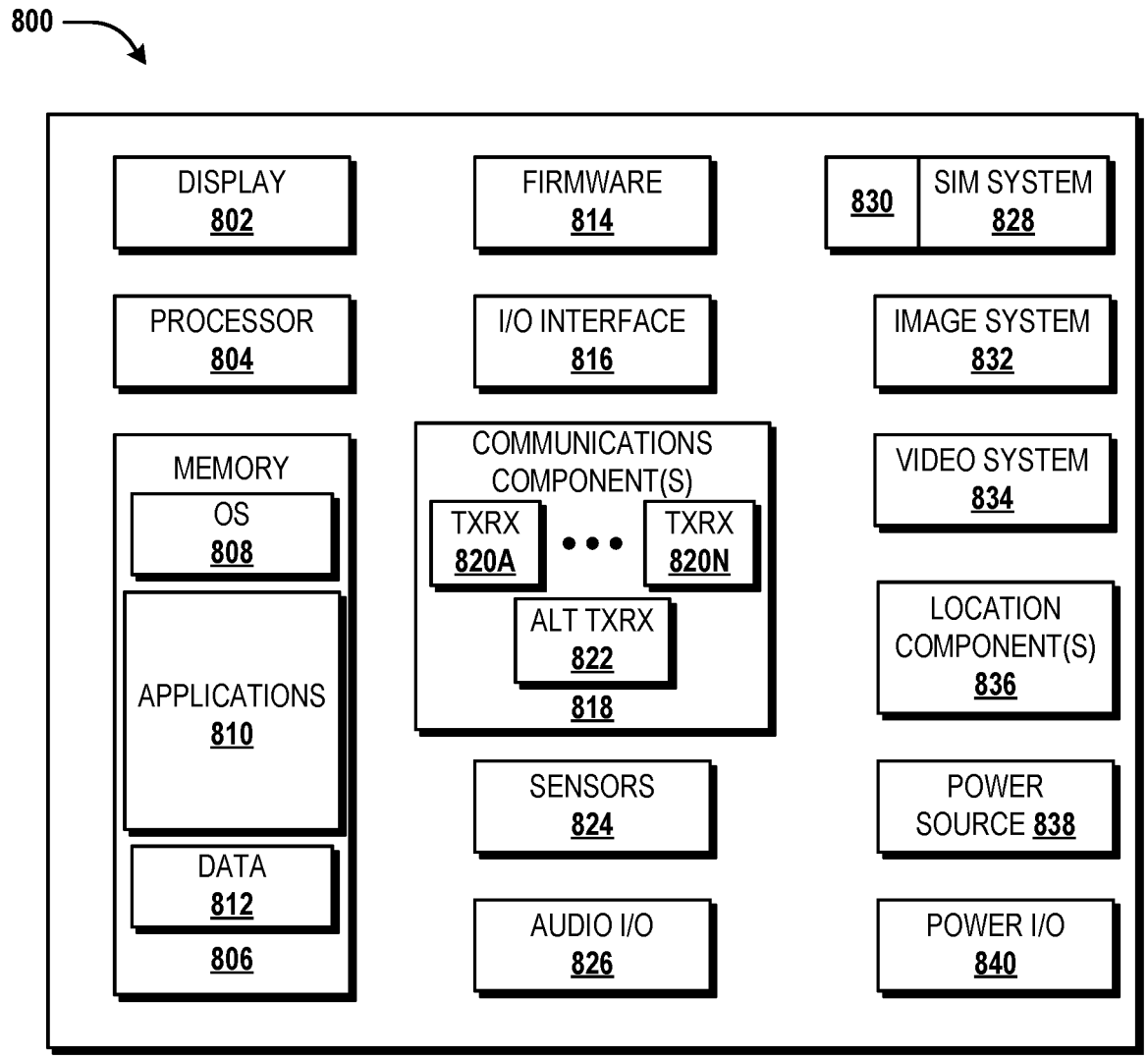
FIG. 8 is a block diagram illustrating an example mobile device capable of implementing aspects of the embodiments disclosed herein.

From operation 516, the method 500 proceeds to operation 518, where the requester device 110 stores the encrypted network access package 126 in memory (best shown in FIG. 8). From operation 518, the method 500 proceeds to operation 520, where the requester device 110 monitors a Wi-Fi communications component (also best shown in FIG. 8) for a Wi-Fi signal generated by the network device 104. From operation 520, the method 500 proceeds to operation 522, where the requester device 110 determines whether a Wi-Fi signal is detected. If the requester device 110 determines that a Wi-Fi signal is not detected (i.e., the requester device 110 is out of range of the Wi-Fi network 102 created by the network device 104), the method 500 returns to operation 520, where the requester device 110 continues to monitor the Wi-Fi communications component for a Wi-Fi signal generated by the network device 104. If the requester device 110 determines that a Wi-Fi signal is detected, the method 500 proceeds to operation 524 shown in FIG. 5B.

Turning now to FIG. 5B, the requester device 110, at operation 524, establishes the unsecure connection 128 with the network device 104. The unsecure connection 128 can be a Wi-Fi connection to the network device 104 via an SSID configured for package management, a guest SSID, or the like. From operation 524, the method 500 proceeds to operation 526, where the requester device 110 receives, from the network device 104, the package request 130. From operation 526, the method 500 proceeds to operation 528, where the requester device 110 sends the encrypted network access package 126 to the network device 104 via the unsecure connection 128. From operation 528, the method 500 proceeds to operation 530, where the requester device 110 establishes the secure connection 136 with the network device 104 based upon the secure network access configuration included in the encrypted network access package 126. From operation 530, the method 500 proceeds to operation 532, where the requester device 110 communicates with the Wi-Fi network 102 over the secure connection 136 in accordance with the secure network access configuration included in the encrypted network access package 126. From operation 532, the method 500 returns to FIG. 4A, and particularly to operation 514, where the method 500 ends.

Figure 6:
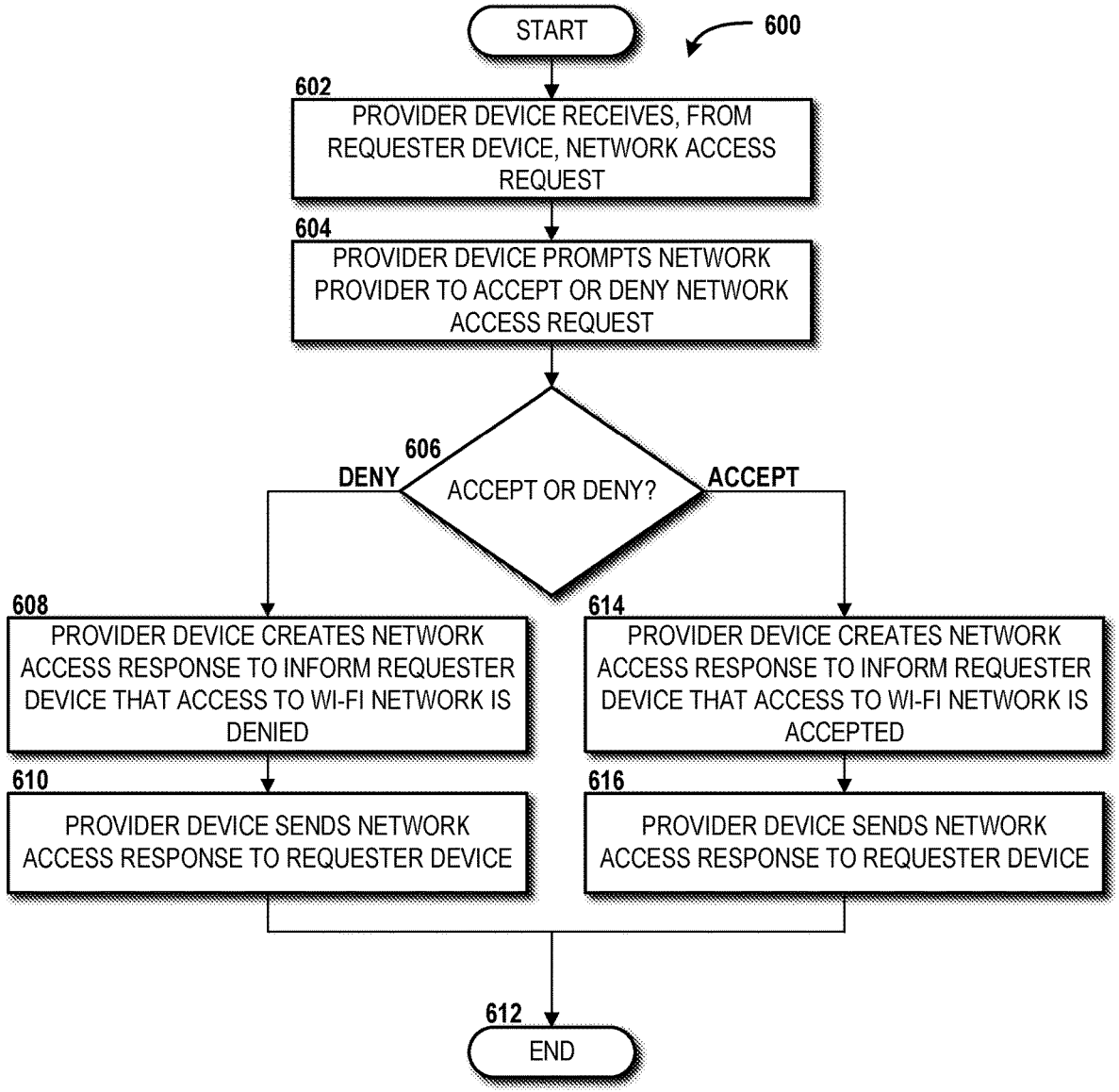
FIG. 6 is a flow diagram illustrating aspects of a method for operating a provider device, according to an illustrative embodiment of the concepts and technologies disclosed herein.

Turning now to FIG. 6, a method 600 for operating the provider device 112 will be described, according to an illustrative embodiment of the concepts and technologies disclosed herein. The method 600 begins and proceeds to operation 602, where the provider device 112 receives, from the requester device 110, the network access request 118. From operation 602, the method 600 proceeds to operation 604, where the provider device 112 prompts the network provider to accept or deny the network access request 118. The prompt might be provided via a network access notification ("notification") 702.

Figure 7A:
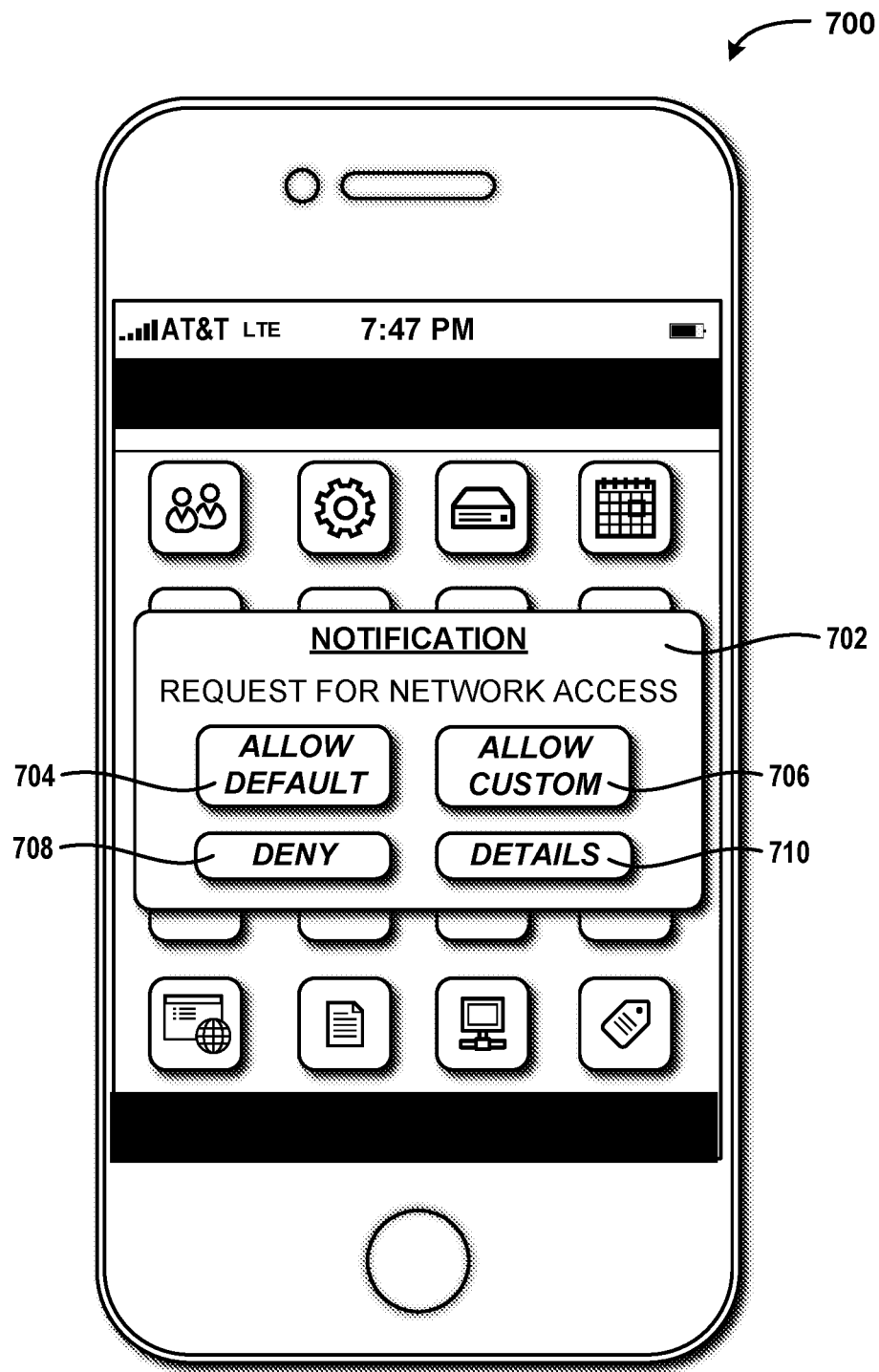
FIGS. 7A-7B are user interface diagrams illustrating a GUI through which a network provider can respond to network access requests, according to an illustrative embodiment of the concepts and technologies disclosed herein.
Figure 7B:
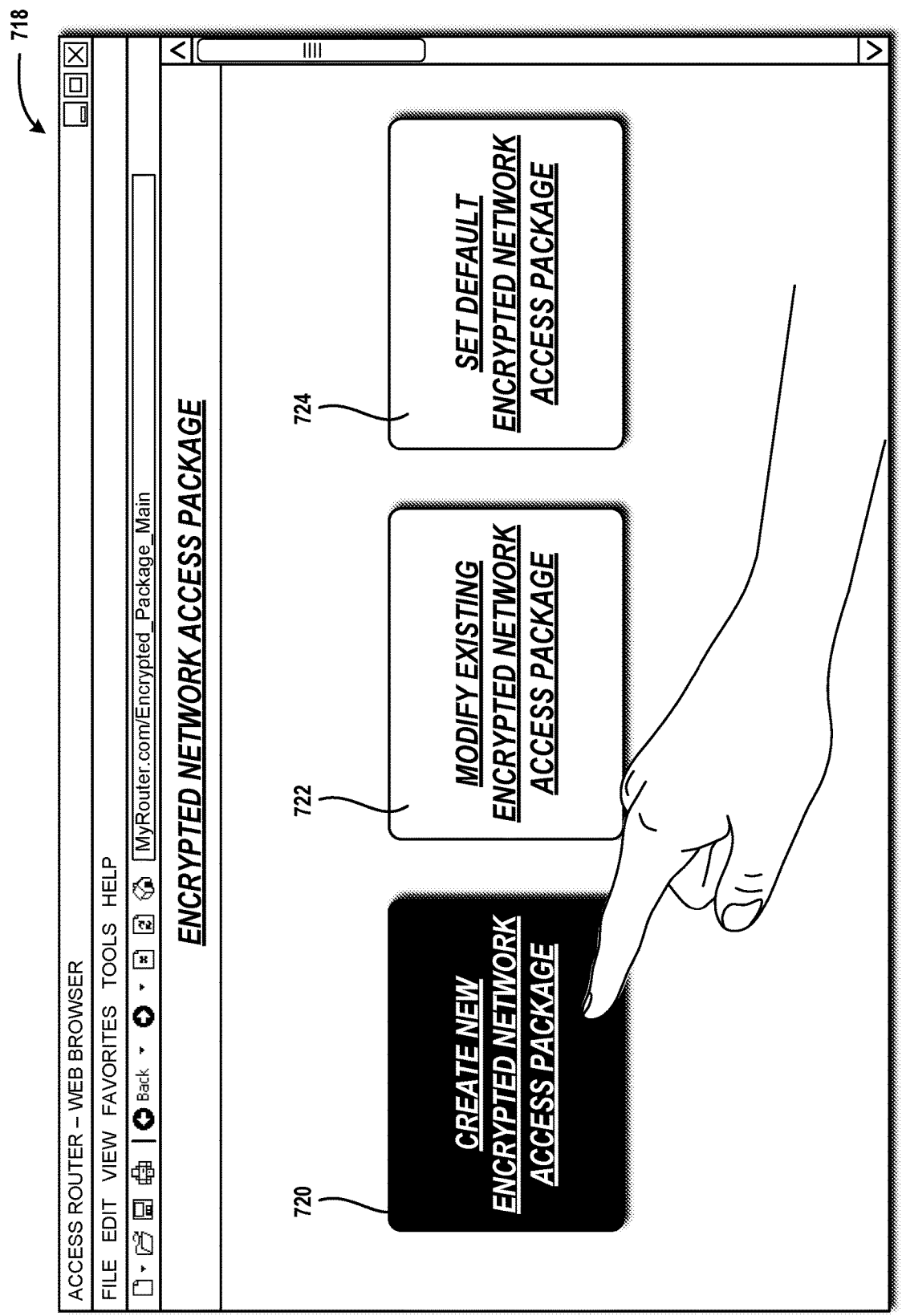

Turning briefly to FIG. 7A, a mobile device GUI 700 is illustrated. In the illustrated example, the mobile device GUI 700 shows the notification 702. The notification 702 includes selectable software buttons for different response options, including an Allow Default option 704, and Allow Custom option 706, a Deny option 708, and a Details option 710. The Allow Default option 704, when selected, causes the provider device 112 to generate the network access response 120 including the accept message 122 along with the encrypted network access package 126 with a secure network access configuration that has been assigned the default tag. The Allow Custom option 706, when selected, causes the provider device 112 to present an encrypted network access package GUI 718, as illustrated in FIG. 7B. The encrypted network access package GUI 718 includes a Create New Encrypted Network Access Package option 720 that, when selected, allows the network provider to create a new encrypted network access package via the package configuration software user interface 420 shown in FIG. 4C, for example. The encrypted network access package GUI 718 also includes a Modify Existing Encrypted Network Access Package option 722 that, when selected, allows the network provider to modify an existing encrypted network access package. The encrypted network access package GUI 718 also includes a set default encrypted network access package 724 that, when selected, allows the network provider to set a particular encrypted network access package as the default package (i.e., assign default tag). After the network provider has customized the secure network access configuration, the provider device 112 can generate the network access response 120 including the accept message 122 along with the encrypted network access package 126 with the customized secure network access configuration. The Deny option 708, when selected, causes the provider device 112 to generate the network access response 120 including the deny message 124. The Details option 710, when selected, causes the provider device 112 to present details associated with the network access request 118, including, for example, details regarding the requester and/or the requester device 110, such as the requester identity 114.

Returning to FIG. 6, the method proceeds from operation 604 to operation 606, where the provider device 112 determines whether the network provider has accepted or denied the network access request 118. If the provider device 112 determines that the network provider has denied the network access request 118, the method 600 proceeds to operation 608, where the provider device 112 creates a network access response to inform the requester device 110 that access to the Wi-Fi network 102 is denied. For example, in response to receiving input to deny the network access request 118 (e.g., selection of the Deny option 710 described above), the provider device 112 creates the network access response 120, including the deny message 124, to inform the requester device 110 that access to the Wi-Fi network 102 is denied. From operation 608, the method 600 proceeds to operation 610, where the provider device 112 sends the network access response 120 to the requester device 110. From operation 610, the method 600 proceeds to operation 612, where the method 600 ends.

If, however, at operation 606, the provider device 112 determines that the network provider has accepted the network access request 118, the method 600 proceeds to operation 614, where the provider device 112 creates a network access response to inform the requester device 110 that access to the Wi-Fi network 102 is accepted. In addition, the network access response can include a network access package, including a secure network access configuration based upon which a secure connection 136 (FIG. 1) can be created to allow the requester device 110 access to the Wi-Fi network 102. For example, in response to receiving input to accept the network access request 118 (e.g., selection of the Allow Default option 704 or the Allow Custom option 706 and subsequent input described above), the provider device 112 creates the network access response 120, including the accept message 122 to inform the requester device 110 that access to the Wi-Fi network 102 is accepted along with the encrypted network access package 126. From operation 614, the method 600 proceeds to operation 616, where the provider device 112 sends the network access response 120, including the accept message 122 and the encrypted network access package 126 to the requester device 110. From operation 616, the method 600 proceeds to operation 612, where the method 600 ends.

Turning now to FIG. 8, an illustrative mobile device 800 and components thereof will be described. In some embodiments, the requester device 110 and/or the provider device 112 is/are configured the same as or similar to the mobile device 800. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various GUI elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in a memory 806, or the like. In some embodiments, the applications 810 also can include a user interface ("UI") application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in dialing telephone numbers, entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. According to various embodiments, the data 812 can include, for example, telephone dialer applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as one or more IP access networks and/or one or more circuit access networks, which might be included, for example, in the network 102. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, 5G, and greater generation technology standards. Moreover, the communications component 818 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 818 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from GPS devices, assisted GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
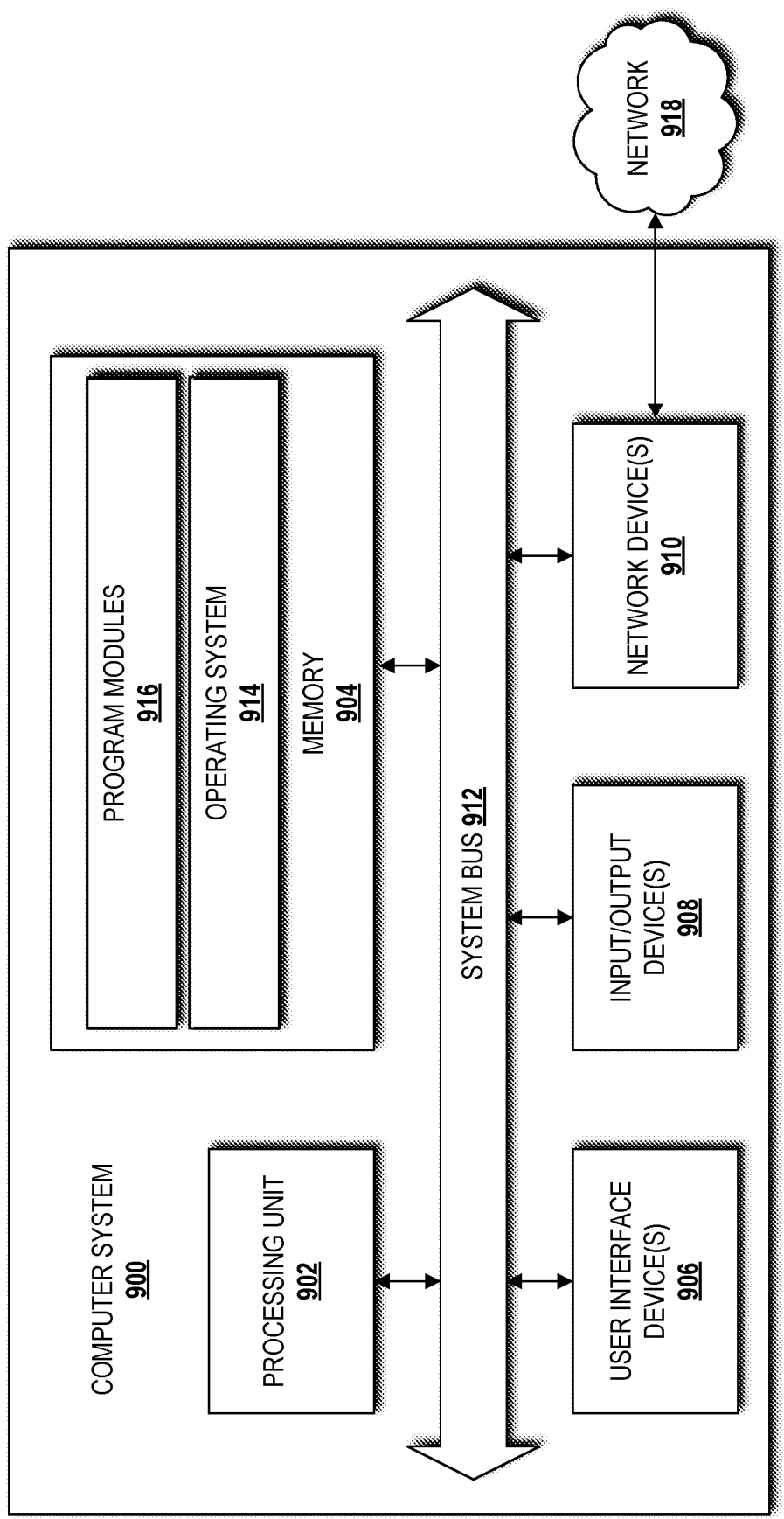
FIG. 9 is a block diagram illustrating an example computer system capable of implementing aspects of the embodiments presented herein.

FIG. 9 is a block diagram illustrating a computer system 900 configured to provide the functionality in accordance with various embodiments of the concepts and technologies disclosed herein. In some embodiments, the requester device(s) 110 and/or the provider device(s) 112 can be configured, at least in part, like the architecture of the computer system 900. It should be understood, however, that modification to the architecture may be made to facilitate certain interactions among elements described herein.

The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 904 communicates with the processing unit 902 via the system bus 912. In some embodiments, the memory 904 is operatively connected to a memory controller (not shown) that enables communication with the processing unit 902 via the system bus 912. The illustrated memory 904 includes an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 916 may include various software and/or program modules to perform the various operations described herein. The program modules 916 and/or other programs can be embodied in computer-readable media containing instructions that, when executed by the processing unit 902, perform various operations such as those described herein. According to embodiments, the program modules 916 may be embodied in hardware, software, firmware, or any combination thereof.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, PDAs, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer. In some embodiments, the I/O devices 908 can be used for manual controls for operations to exercise under certain emergency situations.

The network devices 910 enable the computer system 900 to communicate with other networks or remote systems via a network 918, which can be or can include the network 102. Examples of the network devices 910 include, but are not limited to, a modem, a radio frequency ("RF") or infrared ("IR") transceiver, a telephonic interface, a bridge, a router, or a network card. The network 918 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 914 may be a wired network such as, but not limited to, a Wide Area Network ("WAN"), a wired Personal Area Network ("PAN"), or a wired Metropolitan Area Network ("MAN"). The network 918 may be any other network described herein.

Figure 10:
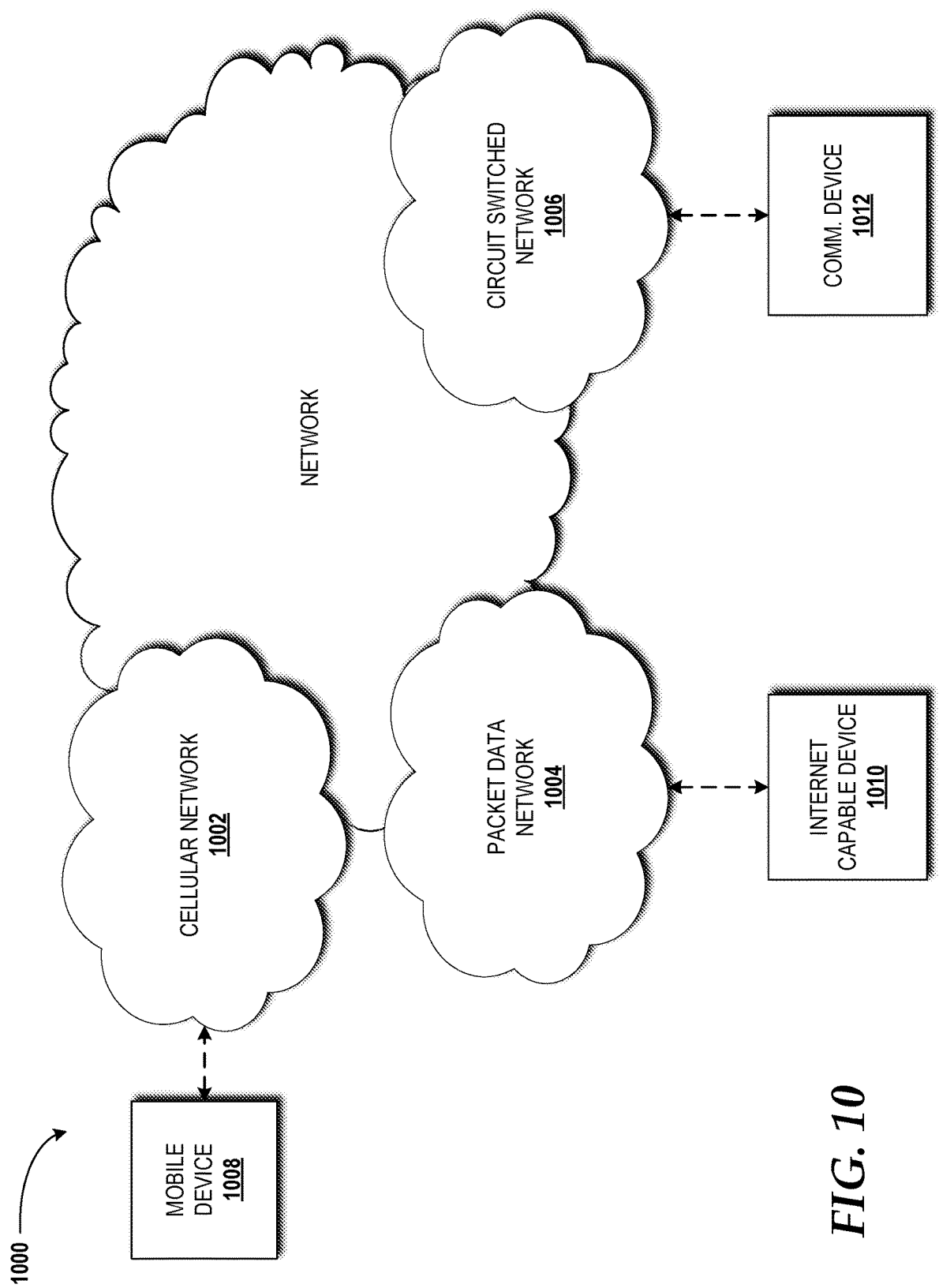
FIG. 10 is a diagram illustrating a network, according to an illustrative embodiment.

Turning now to FIG. 10, details of a network 1000 are illustrated, according to an illustrative embodiment. In some embodiments, the network 1000 includes the Wi-Fi network 102 and/or the Internet 106. The network 1000 includes a cellular network 1002, a packet data network 1004, for example, the Internet, and a circuit switched network 1006, for example, a PSTN. The cellular network 1002 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, the requester device(s) 110, the provider device(s) 112, a cellular telephone, a user equipment, a mobile terminal, a PDA, a laptop computer, a handheld computer, and combinations thereof, can be operatively connected to the cellular network 1002. The cellular network 1002 can be configured as a 2G GSM network and can provide data communications via GPRS and/or EDGE. Additionally, or alternatively, the cellular network 1002 can be configured as a 3G UMTS network and can provide data communications via the HSPA protocol family, for example, HSDPA, EUL (also referred to as HSUPA), and HSPA+. The cellular network 1002 also is compatible with 4G mobile communications standards such as LTE, or the like, as well as evolved and future mobile standards.

The packet data network 1004 includes various devices, for example, servers, computers, databases, and other devices in communication with one another, as is generally known. The packet data network 1004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1004 includes or is in communication with the Internet. The circuit switched network 1006 includes various hardware and software for providing circuit switched communications. The circuit switched network 1006 may include, or may be, what is often referred to as a POTS. The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable devices 1010, for example, the requester device(s) 112, provider device(s) 112, a PC, a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010. In the specification, the network is used to refer broadly to any combination of the networks 1002, 1004, 1006 shown in FIG. 10 and/or the network 102.

Based on the foregoing, it should be appreciated that concepts and technologies directed to network authentication via encrypted network access packages have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A provider device comprising:
   a processor; and
   memory comprising computer-executable instructions that, when executed by the processor, cause the processor to perform operations comprising
   receiving, from a requester device, a network access request requesting, on behalf of the requester device, access to a Wi-Fi network associated with a network provider, wherein the Wi-Fi network is provided, at least in part, by a network device,
   in response to the network access request, prompting, the network provider to accept or deny the requester device access to the Wi-Fi network, receiving input indicating that the network provider accepts the network access request, in response to the input indicating that the network provider accepts the network access request, presenting a package configuration software user interface provided by the network device, wherein the package configuration software user interface comprises a new network access package option, a modify existing network access package option, and a set default network access package option, wherein the package configuration software user interface further comprises, in response to selection of the new network access package option, network access configuration parameters selectable to create, by the network device, a network access package comprising a secure network access configuration to be utilized by the network device to establish, at least in part, a secure connection with the requester device to provide the requester device access to the Wi-Fi network in accordance with the secure network access configuration, and wherein the network device creates the network access package based, at least in part, on input received via the package configuration software user interface, and creating a network access response comprising the network access package, and sending the network access response to the requester device.

2. The provider device of claim 1, wherein creating the network access response comprises receiving, via the package configuration software user interface, the input to define the secure network access configuration for the network access package.

3. The provider device of claim 2, wherein the package configuration software user interface comprises a web interface or a native application interface.

4. The provider device of claim 1, wherein the secure network access configuration comprises a default configuration.

5. The provider device of claim 1, wherein the secure network access configuration comprises a custom configuration specific to the requester device.

6. The provider device of claim 1, wherein the network access configuration parameters comprise at least one of an allowed network parameter, an allowed port parameter, an allowed IP address range parameter, a time limit parameter, a re-entry allowed parameter, a restrict data rate parameter, or a restrict data usage parameter.

7. A requester device comprising:

a processor; and memory that stores instructions that, when executed by the processor, cause the processor to perform operations comprising generating a network access request requesting access to a Wi-Fi network associated with a network provider, wherein the Wi-Fi network is provided, at least in part, by a network device, sending the network access request to a provider device associated with the network provider, receiving, from the provider device, an encrypted network access package created by the network device based, at least in part, on input received via a package configuration software user interface provided by the network device and presented by the provider device, wherein the package configuration software user interface comprises a new encrypted network access package option, a modify existing encrypted network access package option, and a set default encrypted network access package option, and wherein the package configuration software user interface further comprises, in response to selection of the new encrypted network access package option, network access configuration parameters selectable to create, by the network device, the encrypted network acccess package comprising a secure network access configuration to be utilized by the network device to establish, at least in part, a secure connection with the requester device to provide the requester device access to the Wi-Fi network in accordance with the secure network access configuration, establishing, with the network device, an unsecure connection, sending, via the unsecure connection, the encrypted network access package to the network device, wherein the network device decrypts the encrypted network access package to extract the secure network access configuration, and establishing, with the network device, the secure connection in accordance with the secure network access configuration.

8. The requester device of claim 7, wherein receiving, from the provider device, the encrypted network access package comprises receiving, from the provider device, a network access response comprising the encrypted network access package, wherein the network access response further comprises an indication that the network access request was accepted, and wherein the operations further comprise:

in response to the indication that the network access request was accepted, presenting a notification to inform a user of the requester device that the network access request was accepted.

9. The requester device of claim 7, wherein the operations further comprise storing the encrypted network access package in the memory.

10. The requester device of claim 9, further comprising a Wi-Fi communications component; wherein the operations further comprise detecting, via the Wi-Fi communications component, a signal from the Wi-Fi network; and wherein establishing, with the network device, the unsecure connection comprises establishing, with the network device, the unsecure connection in response to detecting the signal from the Wi-Fi network.

11. The requester device of claim 10, wherein the unsecure connection comprises an ad-hoc peer-to-peer connection between the requester device and the network device.

12. The requester device of claim 10, wherein the unsecure connection comprises a dedicated connection for exchanging encrypted network access packages.

13. The requester device of claim 7, wherein the secure network access configuration comprises a default configuration.

14. The requester device of claim 7, wherein the secure network access configuration comprises a custom configuration specific to the requester device.

15. The requester device of claim 7, wherein the network access configuration parameters comprise at least one of an allowed network parameter, an allowed port parameter, an allowed IP address range parameter, a time limit parameter, a re-entry allowed parameter, a restrict data rate parameter, or a restrict data usage parameter.

16. A network device comprising:

a network device interface that provides a Wi-Fi network;

a processor; and memory that stores instructions that, when executed by the processor, cause the processor to perform operations comprising in response to access by a provider device, providing, for display by the provider device, a package configuration software user interface through which a network provider associated with the provider device can configure a network access package comprising a secure network access configuration to be utilized by the network device to establish, at least in part, a secure connection with a requester device to provide the requester device access to the Wi-Fi network in accordance with the secure network access configuration, wherein the package configuration software user interface comprises a new network access package option, a modify existing network access package option, and a set default network access package option, and wherein the package configuration software user interface further comprises, in response to selection of the new network access package option, a plurality of network access configuration parameters selectable by the network provider to create, by the network device, the network access package comprising the secure network access configuration, receiving, via the package configuration software user interface, input to define the secure network access configuration, creating, based upon the input, the network access package comprising the secure network access configuration, wherein the network access package is provided to the requester device by the provider device, receiving the network access package from the requester device, and establishing the secure connection with the requester device to provide the requester device with access to the Wi-Fi network in accordance with the secure network access configuration of the network access package.

17. The network device of claim 16, wherein the package configuration software user interface comprises a web interface or a native application interface.

18. The network device of claim 17, wherein the plurality of network access configuration parameters selectable by the network provider to define the secure network access configuration comprise at least one of an allowed network parameter, an allowed port parameter, an allowed IP address range parameter, a time limit parameter, a re-entry allowed parameter, a restrict data rate parameter, or a restrict data usage parameter.

19. The network device of claim 16, wherein the secure network access configuration comprises a rule specifying a condition under which the requester device is permitted to access the Wi-Fi network, wherein the rule is defined, at least in part, via the input that defines at least a portion of the plurality of network access configuration parameters.

20. The network device of claim 16, further comprising a cryptographic module, executable by the processor to cause the processor to perform further operations comprising encrypting the network access package to create an encrypted network access package, wherein the encrypted network access package can only be decrypted by the network device to provide the requester device access to the Wi-Fi network in accordance with the secure network access configuration.

* * * * *